United States Patent
Okuyama et al.

(10) Patent No.: US 11,691,471 B2
(45) Date of Patent: Jul. 4, 2023

(54) AUTOMOBILE SUSPENSION DEVICE

(71) Applicant: MAZDA MOTOR CORPORATION, Hiroshima (JP)

(72) Inventors: Kazuhiro Okuyama, Aki-gun (JP); Masaya Hiramatsu, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/707,256

(22) Filed: Mar. 29, 2022

(65) Prior Publication Data

US 2022/0314721 A1    Oct. 6, 2022

(30) Foreign Application Priority Data

Mar. 30, 2021 (JP) .................. 2021-058034

(51) Int. Cl.
*B60G 3/18* (2006.01)

(52) U.S. Cl.
CPC ..................... *B60G 3/18* (2013.01)

(58) Field of Classification Search
CPC .... B60G 3/18; B60G 7/001; B60G 2200/156; B60G 3/20
See application file for complete search history.

(56) References Cited

U.S. PATENT DOCUMENTS

| | | | | |
|---|---|---|---|---|
| 2,611,625 A * | 9/1952 | Kishline | ................... | B60G 3/18 280/124.141 |
| 4,474,389 A * | 10/1984 | von der Ohe | ............ | B60G 3/20 280/124.153 |
| 5,005,857 A * | 4/1991 | Camuffo | ............... | B60G 21/055 280/124.135 |
| 5,513,874 A * | 5/1996 | Mori | ........................ | B60G 3/20 280/124.108 |
| 2004/0140641 A1* | 7/2004 | Eppelein | ................... | B60G 3/26 280/124.135 |

(Continued)

FOREIGN PATENT DOCUMENTS

| | | |
|---|---|---|
| DE | 3843613 A1 * | 7/1990 |
| DE | 10 2012 007325 A1 | 10/2013 |

(Continued)

OTHER PUBLICATIONS

The extended European search report issued by the European Patent Office dated Jul. 21, 2022, which corresponds to European Patent Application No. 22164953.6-1009 and is related to U.S. Appl. No. 17/707,256.

*Primary Examiner* — Drew J Brown
(74) *Attorney, Agent, or Firm* — Studebaker & Brackett PC

(57) ABSTRACT

A five-link automobile suspension device is configured to support a lower end of a damper with a lower arm, and is capable of reducing sliding friction while ensuring a road clearance. Embodiments include a lower arm connecting a wheel support and a vehicle body, and a damper that has a lower end connected to the lower arm and is disposed to incline upward toward a vehicle-width-direction inner side in a rear view. A wall surface of the lower arm has a damper mounting portion, which supports a pivot of the damper, at a position lower than a straight line connecting a pivot on a wheel side and a pivot on a vehicle-body side of the lower arm. A bottom surface of the lower arm has a bulge formed at a position under the damper mounting portion.

2 Claims, 13 Drawing Sheets

(56) References Cited

U.S. PATENT DOCUMENTS

| | | | | |
|---|---|---|---|---|
| 2006/0175788 A1* | 8/2006 | Nuno | ............... | B60G 3/20 |
| | | | | 280/124.153 |
| 2007/0007742 A1* | 1/2007 | Allen | ............... | B60G 7/008 |
| | | | | 280/124.134 |
| 2016/0167472 A1* | 6/2016 | Meyer | ............... | B60G 7/001 |
| | | | | 280/124.125 |
| 2018/0079269 A1* | 3/2018 | Yanagida | ............... | B60G 7/008 |
| 2020/0324599 A1* | 10/2020 | Frenzel | ............... | B60G 7/02 |
| 2021/0129611 A1* | 5/2021 | Kirsch | ............... | F16F 1/041 |
| 2022/0250430 A1* | 8/2022 | Kolp | ............... | B60G 7/02 |

FOREIGN PATENT DOCUMENTS

| | | |
|---|---|---|
| DE | 10 2013 222234 A1 | 4/2015 |
| DE | 102017219778 A1 * | 5/2019 |
| EP | 1 642 754 A1 | 4/2006 |
| EP | 3 498 504 A1 | 6/2019 |
| JP | 2004-521826 A | 7/2004 |

* cited by examiner

AUTOMOBILE SUSPENSION DEVICE

TECHNICAL FIELD

The present disclosure relates to an automobile suspension device, and more particularly relates to a rear wheel multi-link suspension constituted by five I-links.

BACKGROUND ART

Conventionally, there has been known a multi-link suspension having five I-links (hereinafter referred to as "arms"), wherein each arm's vehicle-body-side end is connected to a vehicle body, and each arm's wheel-side end is connected to a wheel support (hub carrier) that supports a wheel. Such a multi-link suspension having five arms has high performance potential because it is possible to arrange the respective arms so as to be optimally restrained according to requirements for the degree of freedom of five motions except for an up and down stroke of a rear wheel.

In recent years, there is a known configuration of such a multi-link suspension in which a lower end of a damper as a shock absorber is connected to a lower arm among the five arms (see, for example, Published International Patent Application No. 2004-521826).

SUMMARY

In order to enhance the shock absorbing effect, minimizing the inclination of the damper is desired to reduce sliding friction by matching a load input direction and a deformation direction of the damper. Specifically, in a case where the lower end of the damper is mounted to the lower arm, in order to reduce a bending force which is applied to the damper when the lower arm moves up and down due to the up and down stroke of the wheel, it is preferable to make the mounting angle (inclination angle) of the damper as small as possible to make it close to the vertical direction. However, when the lower end of the damper is mounted to the lower arm, it is necessary to set the geometry of the lower arm and the damper while ensuring a road clearance for the lower arm, and thus there is a layout limitation for the mounting angle of the damper.

Therefore, the present disclosure has been made to solve the above-mentioned problem, and to provide an automobile suspension device that is a 5-link suspension device configured to support a lower end of a damper with a lower arm, and is capable of reducing sliding friction while ensuring road clearance.

In order to solve the above-mentioned problem, the present disclosure relates to an automobile suspension device including: a wheel support that supports a wheel, and has an opening formed at a center portion to allow an axle to pass therethrough; a trailing arm and a lower arm connecting a lower portion of the wheel support and a vehicle body; an upper arm and a leading arm connecting an upper portion of the wheel support and the vehicle body; a control arm connecting a rear portion of the wheel support and the vehicle body; and a damper that has an upper end connected to the vehicle body and a lower end connected to the lower arm, and is disposed to incline upward toward a vehicle-width-direction inner side in a rear view, the automobile suspension device being characterized in that the lower arm has a vehicle-body-side end connected to the vehicle body through a pivot and a wheel-side end connected to the wheel support through a pivot, the damper is connected to the lower arm through a pivot, the lower arm has an upwardly open U-shaped cross-section formed by front and rear wall surfaces and a bottom surface extending in a longitudinal direction of the lower arm, each of the front and rear wall surfaces of the lower arm has a damper mounting portion, which axially supports the pivot of the damper, at a position lower than a straight line connecting the pivot on the wheel side of the lower arm and the pivot on the vehicle-body side of the lower arm, and the bottom surface of the lower arm is formed with a bulge bulging downward, at a position under the damper mounting portion, to accommodate the pivot of the damper.

According to the present disclosure thus configured, each of the front and rear wall surfaces of the lower arm has the damper mounting portion, which supports the pivot of the damper, at a position lower than the straight line connecting the pivot on the wheel side of the lower arm and the pivot on the vehicle-body side of the lower arm, and the bottom surface of the lower arm is formed with the bulge bulging downward, at a position under the damper mounting portion, to accommodate the pivot of the damper. Thus, since the damper mounting portion is set at the position lower than the straight line connecting the pivot on the wheel side of the lower arm and the pivot on the vehicle-body side of the lower arm, the inclination angle of the damper can be made smaller by a corresponding amount in the rear view. That is, the inclination angle can be set to allow the damper to stand vertically. Hence, in the 5-link suspension device configured to support the lower end of the damper with the lower arm, it is possible to reduce sliding friction while ensuring road clearance.

Moreover, according to the present disclosure, preferably, each of the front and rear wall surfaces of the lower arm has a stabilizer-link mounting portion at a position on a vehicle-width-direction inner side relative to the damper mounting portion, and each of the front and rear wall surfaces of the lower arm is formed with a rib extending in the longitudinal direction at least from the damper mounting portion to the stabilizer-link mounting portion.

According to the present disclosure thus configured, deformation of the front and rear wall surfaces can be prevented by the ribs, thereby reducing geometric changes in the damper mounting portion and the stabilizer-link mounting portion. That is, since the damper mounting portion is set at a position lower than the straight line connecting the pivot on the wheel side of the lower arm and the pivot on the vehicle-body side of the lower arm, and the bulge is formed, the area of the wall surface is increased, and the lower arm is easy to deform due to the increase of the area, but deformation of the front and rear wall surfaces can be prevented by the ribs.

According to the automobile suspension device of the present disclosure, having a 5-link suspension device configured to support the lower end of the damper with the lower arm, it is possible to reduce sliding friction while ensuring road clearance.

DETAILED DESCRIPTION

Hereinafter, an automobile suspension device according to an embodiment of the present disclosure will be described with reference to the attached drawings.

The embodiment of the present disclosure will be described hereinafter based on the drawings.

Figure 1:
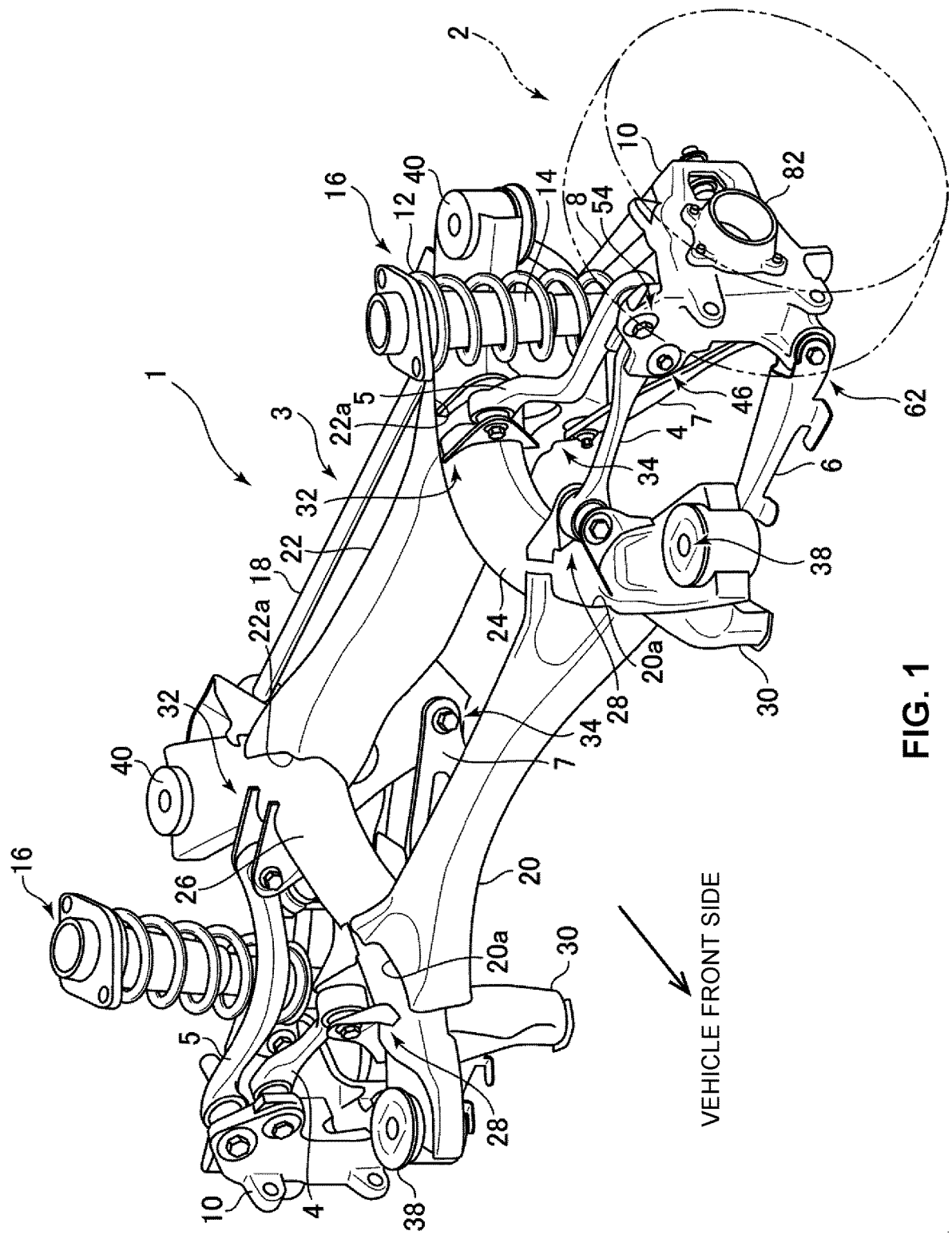
FIG. 1 is a perspective view of a rear suspension assembly of an automobile to which an automobile suspension device according to an embodiment of the present disclosure is applied.
Figure 2:
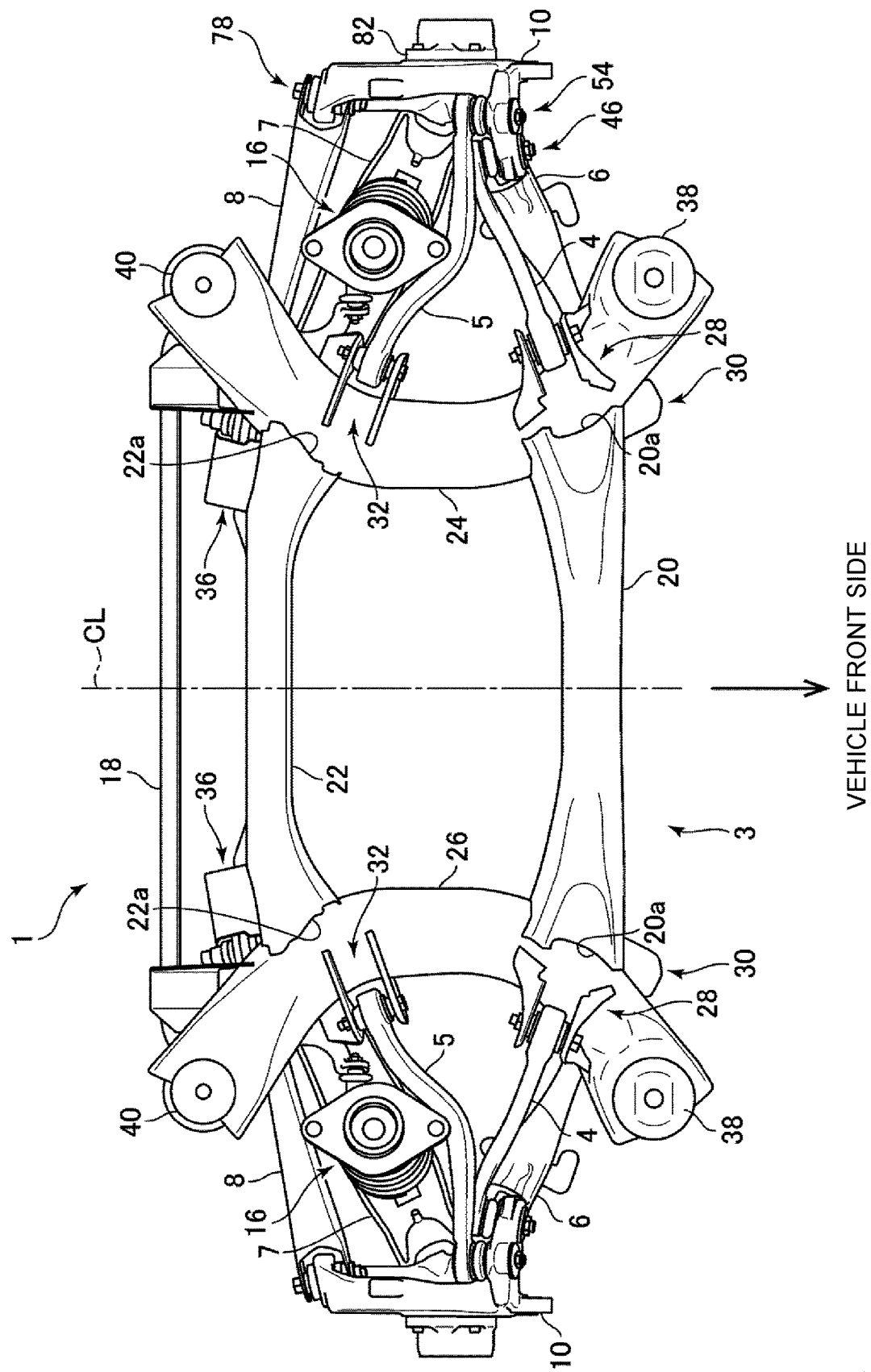
FIG. 2 is a top view of the rear suspension assembly shown in FIG. 1.
Figure 3:
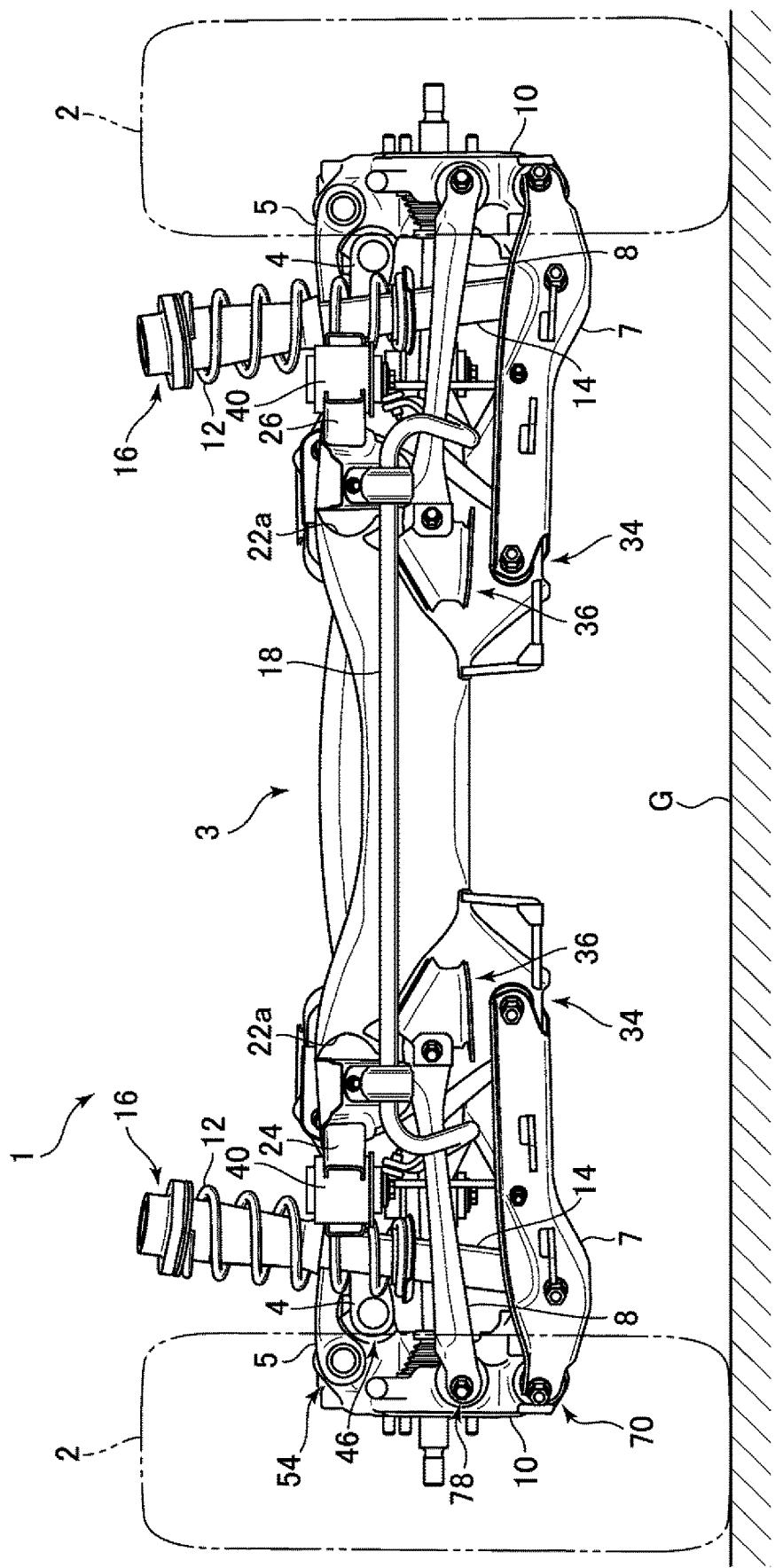
FIG. 3 is a rear view of the rear suspension assembly shown in FIG. 1.

First, an overall configuration of the automobile suspension device according to the embodiment of the present disclosure will be described using FIG. 1 to FIG. 3. FIG. 1 to FIG. 3 show the embodiment in which a rear wheel suspension device 1 (hereinafter simply referred to as the rear suspension) for an automobile according to the embodiment of the present disclosure is applied to each of left and right wheels of the automobile, wherein FIG. 1 is a perspective view of a rear suspension assembly of the automobile to which the automobile suspension device according to the embodiment of the present disclosure is applied, FIG. 2 is a top view of the rear suspension assembly shown in FIG. 1, and FIG. 3 is a rear view of the rear suspension assembly shown in FIG. 1.

The automobile (vehicle) of the present embodiment is a rear-wheel drive vehicle that has an engine mounted in an engine room in a front portion of a vehicle body, and a differential disposed in a rear portion of the vehicle body, which are not shown, to drive rear wheel 2 with an axle (not shown).

As shown in FIG. 1 to FIG. 3, the rear suspension assembly of the rear wheel suspension device 1 has a pair of left and right rear suspensions 1 and a subframe 3.

First, a schematic configuration of the rear suspension 1 will be described.

The rear suspension 1 of the present embodiment is of a multi-link type in which a wheel support (support member, hub carrier) 10 of the rear wheel 2 is connected to the vehicle body with five independent I-links 4 to 8 so as to be capable of stroking. The suspension device 1 includes: a front upper link that virtually constitutes an upper arm (hereinafter referred to as the "upper arm") 4; a rear leading link (hereinafter referred to as the "leading arm") 5; a front trailing link that virtually constitutes a lower arm (hereinafter referred to as the "trailing arm") 6; a rear lower link (hereinafter referred to as the "lower arm") 7; and a toe control link (hereinafter referred to as the "toe control arm") 8 that restricts rotational displacement of the rear wheel 2 around a later-described virtual kingpin axis IK (see FIG. 5). The upper arm 4, the leading arm 5, the trailing arm 6, and the lower arm 7 swing up and down about connecting portions (44, 52, 60, 68) on the vehicle-body side, respectively, thereby allowing the wheel support 10 and the rear wheel 2 to stroke up and down along a predetermined trajectory.

Moreover, provided is a shock absorber 16 including a coil spring 12 and a damper 14 to simultaneously exert a predetermined urging force and an attenuation force while allowing such a stroke of the rear wheel 2. This shock absorber 16 has a cylindrical shape elongated in an up-down direction in which the coil spring 12 and the damper 14 are disposed substantially coaxially, and an upper end thereof is mounted to the vehicle body. A lower end of the shock absorber 16 (lower end of the damper 14) is pivotally attached to the lower arm 7.

Further, a stabilizer bar 18 extending to connect the left and right lower arms 7 is rotatably mounted to the suspension device 1.

Next, a schematic configuration of the subframe 3 will be described.

The subframe 3 is formed by combining mainly four steel plate members into a rectangular frame shape in a plan view, and includes a front cross member 20 and a rear cross member 22 each extending in the vehicle width direction, and a pair of side cross members 24, 26 extending in the front-rear direction on the left and right sides of the vehicle body so as to connect both left-side and right-side ends of the front cross member 20 and the rear cross member 22.

When viewed from above the vehicle, the front cross member 20 extends linearly in the vehicle width direction, and both ends 20a thereof in the vehicle width direction are respectively joined to the front end portions of the side cross members 24, 26 on the left and on the right. When viewed along the vehicle front-rear direction, the front cross member 20 is formed in an entirely curved arch shape such that a center portion in the longitudinal direction is located at a higher position than left and right ends. Moreover, on the left and right ends of the front cross member 20, mounting seats 28 for the upper arms 4 and mounting seats 30 for the trailing arms 6 are respectively provided at locations in close proximity to joined portions 20a with the side cross members 24, 26 and on the upper side and the lower side of the side cross members 24, 26 (see FIG. 4 to FIG. 6). The vehicle-body-side ends of the upper arms 4 are connected to the left-side and right-side mounting seats 28, respectively, and the vehicle-body-side ends of the trailing arms 6 are connected to the left-side and right-side mounting seats 30, respectively, and such a configuration allows the front cross member 20 to receive lateral forces transmitted from the wheels 2 through the arms 4, 6.

The rear cross member 22 extends linearly in the vehicle width direction when viewed from above the vehicle, and both ends 22a thereof in the vehicle width direction are respectively joined to rear ends of the side cross members 24, 26 on the left and on the right. As shown in FIG. 3, when viewed along the vehicle front-rear direction, the rear cross member 22 is formed in an entirely curved arch shape such that a center portion in the longitudinal direction is located at a position lower than the left and right ends. On the left and right ends of the rear cross member 22, mounting seats 32 for the leading arms 5 and mounting seats 34 for the lower arms 7 are provided at locations in close proximity to the joined portions 22a with the side cross members 24, 26 and on the upper side and the lower side of the side cross members 24, 26, respectively (see FIG. 4 and FIG. 5). The vehicle-body-side ends of the leading arms 5 are connected to the left-side and right-side mounting seats 32, respectively, and the vehicle-body-side ends of the lower arms 7 are connected to the left-side and right-side mounting seats 34, respectively, and such a configuration allows the rear cross member 22 to receive lateral forces transmitted from the wheels 2 through the arms 5, 7.

Further, the rear cross member 22 has mounting seats 36 for the toe control arms 8, which are provided on the vehicle-width-direction inner side of each of the side cross members 24, 26, and on the rear surface side of the rear cross member 22 in a top view. The vehicle-body-side ends of the toe control arms 8 are connected to the left-side and right-side mounting seats 36, respectively.

Figure 5:
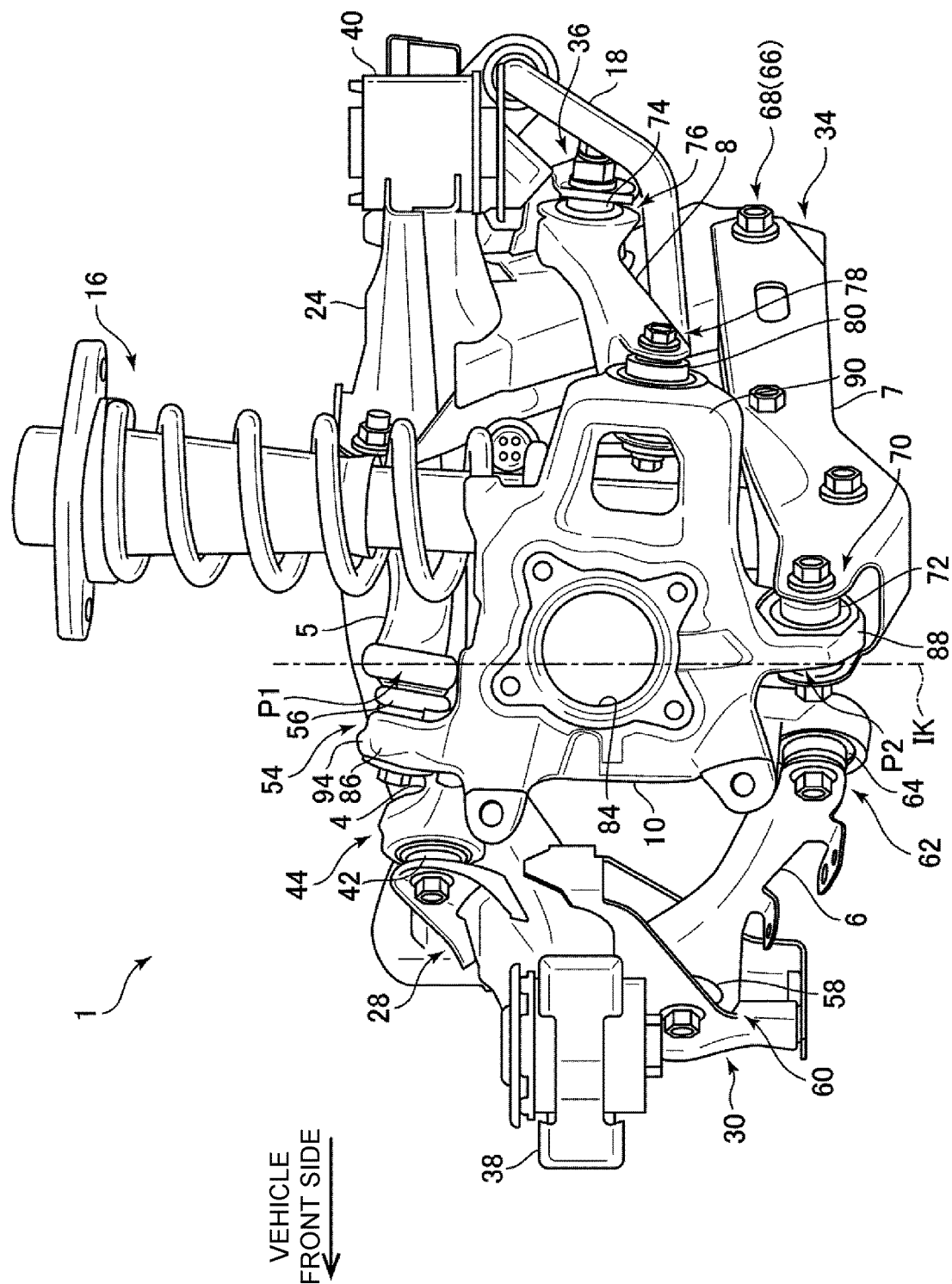
FIG. 5 is a left side view of the rear suspension of FIG. 4.

When viewed from above the vehicle, each of the side cross members 24, 26 on the left and on the right is curved such that the center portion in the longitudinal direction is located on the vehicle-width-direction inner side relative to both ends, and extends obliquely downward toward the vehicle front side from the rear end to the front end in a side view (see FIG. 5). The above-mentioned mounting seats 28, 30 are provided on the front portions of these side cross members 24, 26, and the above-mentioned mounting seats 32, 34 are provided on the rear portions thereof.

Furthermore, the side cross members 24, 26 are provided with elastic mounts 38, 40 for elastically supporting the entire subframe 3 by the vehicle body, and these elastic mounts 38, 40 are provided at four locations in total in the front ends and the rear ends of the side cross members 24, 26. Each of the elastic mounts 38, 40 has a cylindrical shape with an axial line in the up-down direction, and is mounted to a recess formed in each of the side cross members 24, 26. On each of the side cross members 24, 26, each of the elastic mounts 38, 40 is disposed such that a straight line connecting the elastic mount 38 at the front end and the elastic mount 40 at the rear end is substantially parallel to a center line CL in the vehicle front-rear direction (shown only in FIG. 2) when viewed from above the vehicle.

In each of the elastic mounts 38, 40, a predetermined gap, which is called "void", is formed, and each of the elastic mounts 38, 40 is formed such that hardness (a characteristic represented by the magnitude of load (N) which causes a predetermined bending amount (mm)) is different between the front-rear direction and the left-right direction with respect to the axial line.

In the present embodiment, each of the elastic mounts 38, 40 is mounted to the side cross members 24, 36 such that the hardness in the vehicle width direction is greater than the hardness in the vehicle front-rear direction.

Moreover, the present embodiment employs the elastic mounts 38, 40 having hardness different from each other, and the hardness in the vehicle front-rear direction of the elastic mount 38 at the front end is set smaller (softer) than the hardness in the vehicle front-rear direction of the elastic mount 40 at the rear end.

Figure 4:
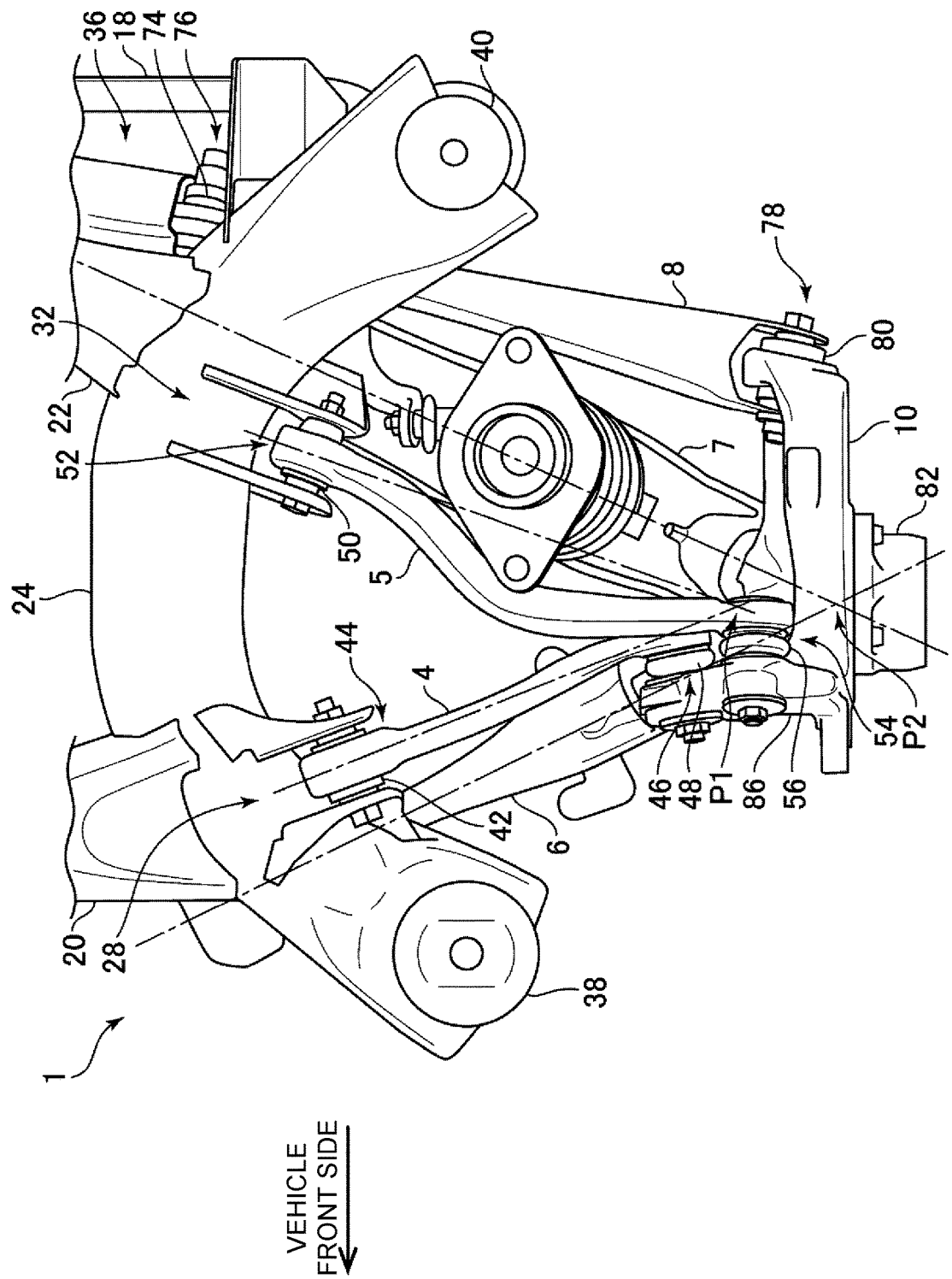
FIG. 4 is a top view of a rear suspension on the left side of a vehicle according to an embodiment of the present disclosure.
Figure 6:
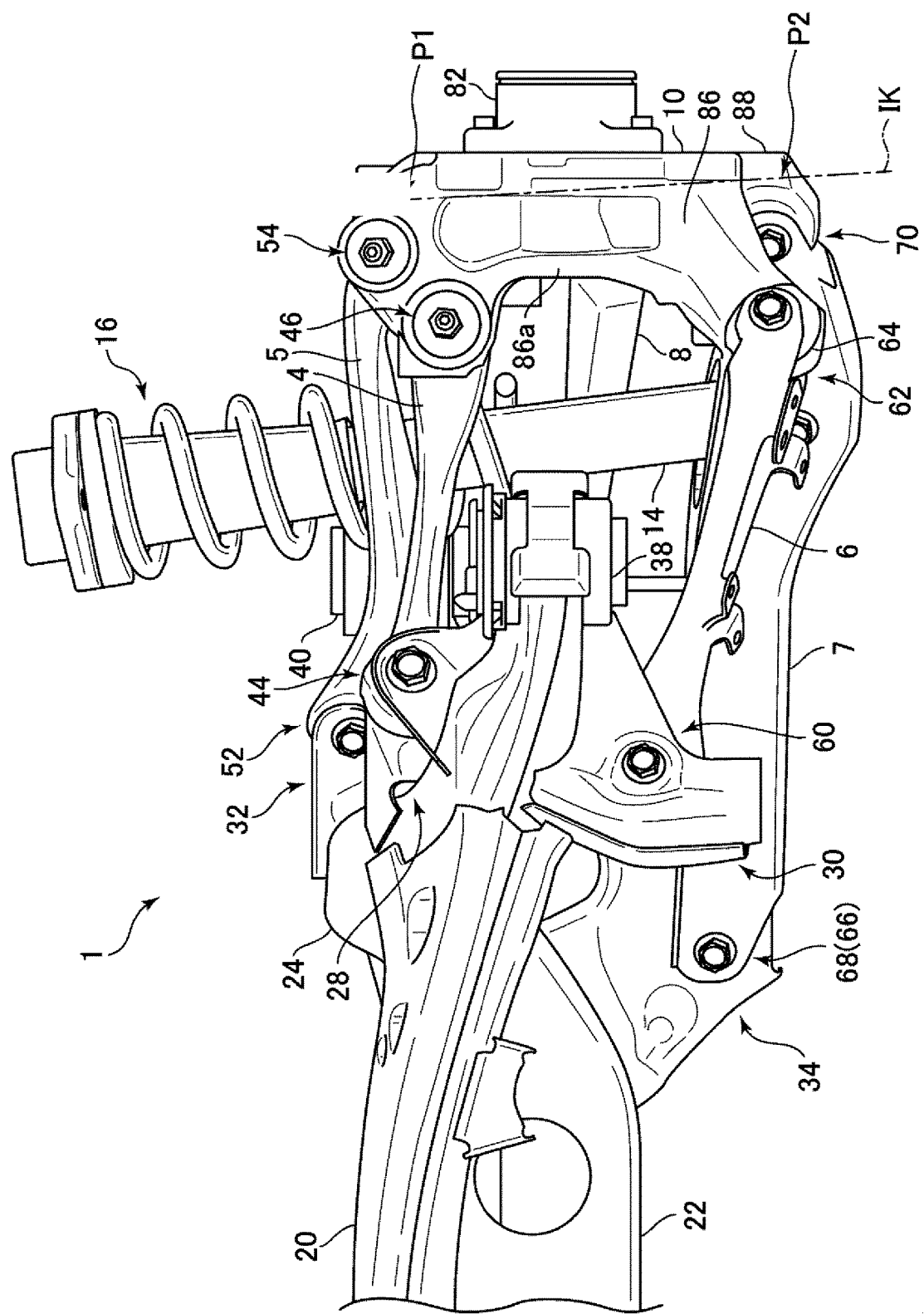
FIG. 6 is a front view of the rear suspension of FIG. 4.
Figure 7:
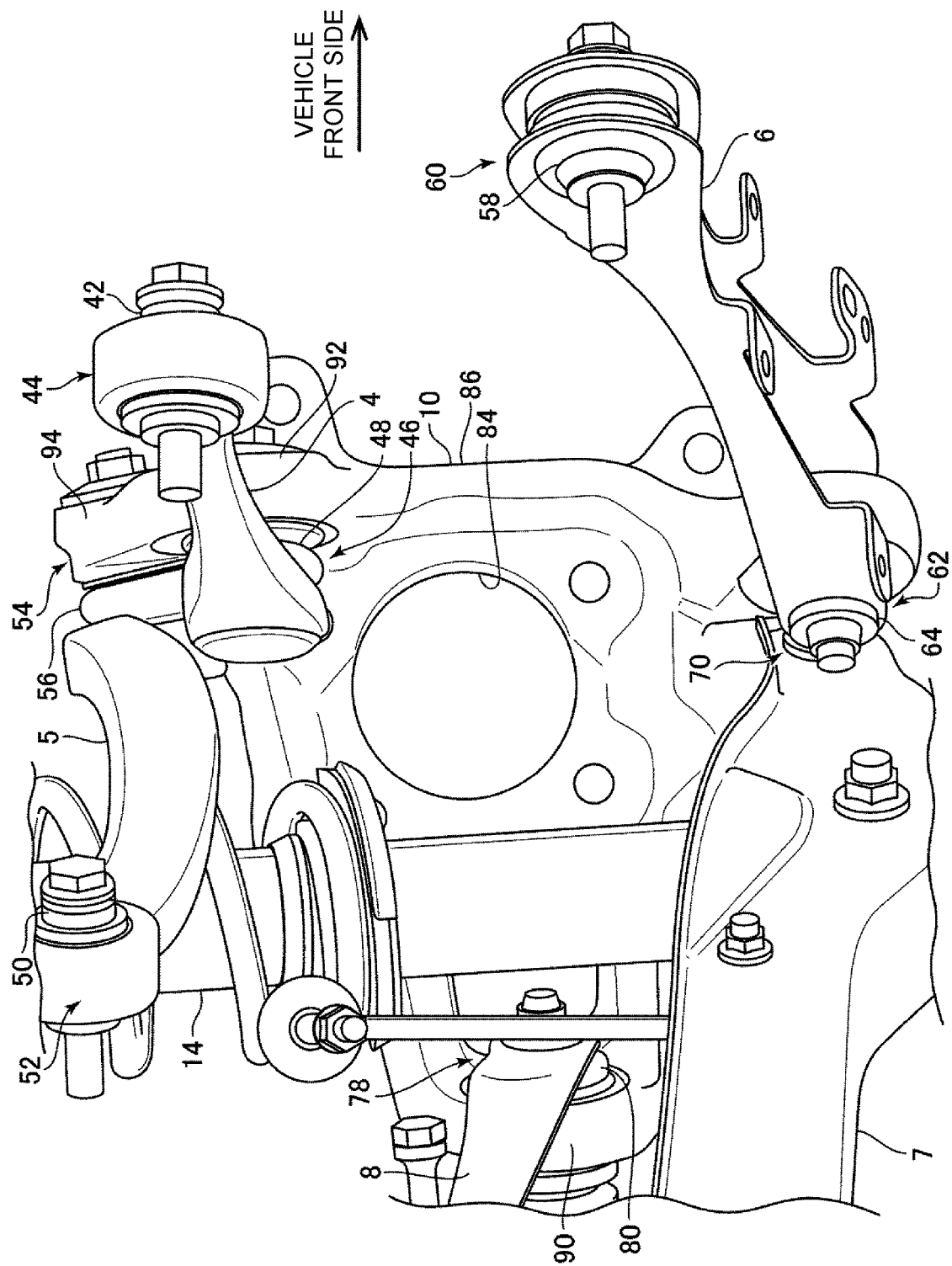
FIG. 7 is a view of the rear suspension of FIG. 4 as viewed from the vehicle-width-direction inner side.

Next, for the rear suspension device 1 on the left side of the vehicle, an arrangement configuration of the arms 4 to 8 will be described using FIG. 4 to FIG. 7. FIG. 4 is a top view of the rear suspension on the left side of the vehicle according to the present embodiment, FIG. 5 is a left side view of the rear suspension of FIG. 4, FIG. 6 is a front view of the rear suspension of FIG. 4, and FIG. 7 is a view of the rear suspension of FIG. 4 as viewed from the vehicle-width-direction inner side. Since the rear suspension device 1 on the right side of the vehicle has the same configuration as the rear suspension 1 on the left side of the vehicle, the description thereof will be omitted hereinafter.

First, as shown in FIG. 4 to FIG. 6, the upper arm 4 has a vehicle-body-side end connected to the above-mentioned mounting seat 28 through an elastic bushing (a rubber bushing, hereinafter referred to as the "bushing") 42. When viewed from above the vehicle, the upper arm 4 extends rearward in an inclined manner so as to be gradually located rearward as the upper arm 4 extends from the connecting portion 44 on the vehicle-body side toward the vehicle-width-direction outer side. At a connecting portion 46 on the wheel 2 side, an end of the upper arm 4 on the wheel 2 side is connected to the wheel support 10 through a bushing 48.

Next, the leading arm 5 has a vehicle-body-side end connected to the above-mentioned mounting seat 32 through a bushing 50. When viewed from above the vehicle, the leading arm 5 extends frontward in an inclined manner so as to be gradually located frontward as the leading arm 5 extends from the connecting portion 52 on the vehicle-body side toward the vehicle-width-direction outer side. At a connecting portion 54 on the wheel 2 side, an end of the leading arm 5 on the wheel 2 side is connected to the wheel support 10 through a bushing 56.

Thus, when viewed from above the vehicle, the two arms 4, 5 on the upper side are arranged to approach each other toward the outer side of the vehicle body.

In the present embodiment, pillow ball joints are employed for the bushings 42, 50 on the vehicle-body side and the bushings 48, 56 on the wheel 2 side.

Next, the trailing arm 6 has a vehicle-body-side end connected to the above-mentioned mounting seat 30 through a bushing 58. When viewed from above the vehicle, the trailing arm 6 extends rearward in an inclined manner so as to be gradually located rearward as the trailing arm 6 extends from the connecting portion 60 on the vehicle-body side toward the vehicle-width-direction outer side. At a connecting portion 62 on the wheel 2 side, an end of the trailing arm 6 on the wheel 2 side is connected to the wheel support 10 through a bushing 64.

Next, the lower arm 7 has a vehicle-body-side end connected to the above-mentioned mounting seat 34 through a bushing 66. When viewed from above the vehicle, the lower arm 7 extends frontward in an inclined manner so as to be gradually located frontward as the lower arm 7 extends from the connecting portion 68 on the vehicle-body side toward the vehicle-width-direction outer side. At a connecting portion 70 on the wheel 2 side, an end of the trailing arm 6 on the wheel 2 side is connected to the wheel support 10 through a bushing 72.

Thus, when viewed from above the vehicle, the two arms 6, 7 on the lower side are arranged to approach each other toward the vehicle-width-direction outer side, and, with displacement toward the rear of the vehicle, toe-in is geometrically applied to the rear wheels 2 mainly by this arrangement (longitudinal force compliance steering). That is, for example, when a braking force from a road surface acts (when a force toward the rear of the vehicle acts) on the rear wheels 2 during braking, the two arms 6, 7 on the lower side are slightly rotationally displaced around their vehicle-body-side ends due to deflection of the bushings 56, 64, respectively, thereby changing the alignment of the rear wheels 2 to the toe-in direction.

Moreover, when a lateral force is applied to the vehicle wheels 2 during steering, the bushings 56, 64 of the arms 6, 7 on the lower side mainly deflect, thereby changing the vehicle wheels 2 to the toe-in direction (lateral force compliance steering).

In the present embodiment, pillow ball joints are employed for the bushings 58, 66 on the vehicle-body side and the bushings 64, 72 on the wheel 2 side.

Next, the toe control arm 8 has a vehicle-body-side end connected to the above-mentioned mounting seat 36 through a bushing 74. When viewed from above the vehicle, the toe control arm 8 extends frontward in an inclined manner so as to be gradually located frontward as the toe control arm 8 extends from a connecting portion 76 on the vehicle-body side toward the vehicle-width-direction outer side. At a connecting portion 78 on the wheel 2 side, an end of the trailing arm 6 on the wheel 2 side is connected to the wheel support 10 through a bushing 80.

In the present embodiment, pillow ball joints are employed for the bushing 74 on the vehicle-body side and the bushing 80 on the wheel 2 side.

Here, as shown in FIG. 4 to FIG. 6, the rear suspension 1 has the virtual kingpin axis IK vertically connecting an intersection point P1 between a virtual extension line of the upper arm 4 and a virtual extension line of the leading arm 5 to an intersection point P2 between a virtual extension line of the trailing arm 6 and a virtual extension line of the lower arm 7. This virtual kingpin axis is the instantaneous rotation center of the rear wheel 2 turning in the steering direction (toe direction).

Next, the configuration of the wheel support 10 and the mounting configuration of the arms will be described using FIG. 4 to FIG. 7.

First, as shown in FIG. 4 to FIG. 7, the wheel support 10 has a hub 82 mounted at the center of the wheel support 10, and an opening 84 formed therein through which the axle (not shown) penetrates.

Moreover, the wheel support 10 is formed with a front raised wall (arm mount reinforcement portion) 86 that projects toward the vehicle-width-direction inner side at a portion on the vehicle front side relative to the opening 84 (a portion on the vehicle front side relative to the axle), and the upper arm 4, the leading arm 5, and the trailing arm 6 are connected to this front raised wall 86. That is, the connecting portions 44, 54, 62 and the bushings 48, 56, 64 on the wheel 2 side of the upper arm 4, the leading arm 5 and the above-mentioned trailing arm 6 are provided on this front raised wall 86. As shown in FIG. 6, a reinforcement rib 86a is formed on an outer edge of this front raised wall 86.

Further, the wheel support 10 is formed with a lower raised wall (arm mount reinforcement portion) 88 that projects toward the vehicle-width-direction inner side at a portion under the opening 84, and the lower arm 7 is connected to this lower raised wall 88. That is, the connecting portion 70 and the bushing 72 on the wheel 2 side of the above-mentioned lower arm 7 are provided on this lower raised wall 88.

Furthermore, the wheel support 10 is formed with a rear raised wall (arm mount reinforcement portion) 90 that projects toward the vehicle-width-direction inner side at a portion on the vehicle rear side relative to the opening 84 (a portion on the vehicle rear side relative to the axle), and the toe control arm 8 is connected to this rear raised wall 90. That is, the connecting portion 78 and the bushing 80 on the wheel 2 side of the above-mentioned toe control arm 8 are provided on this rear raised wall 90.

Figure 8:
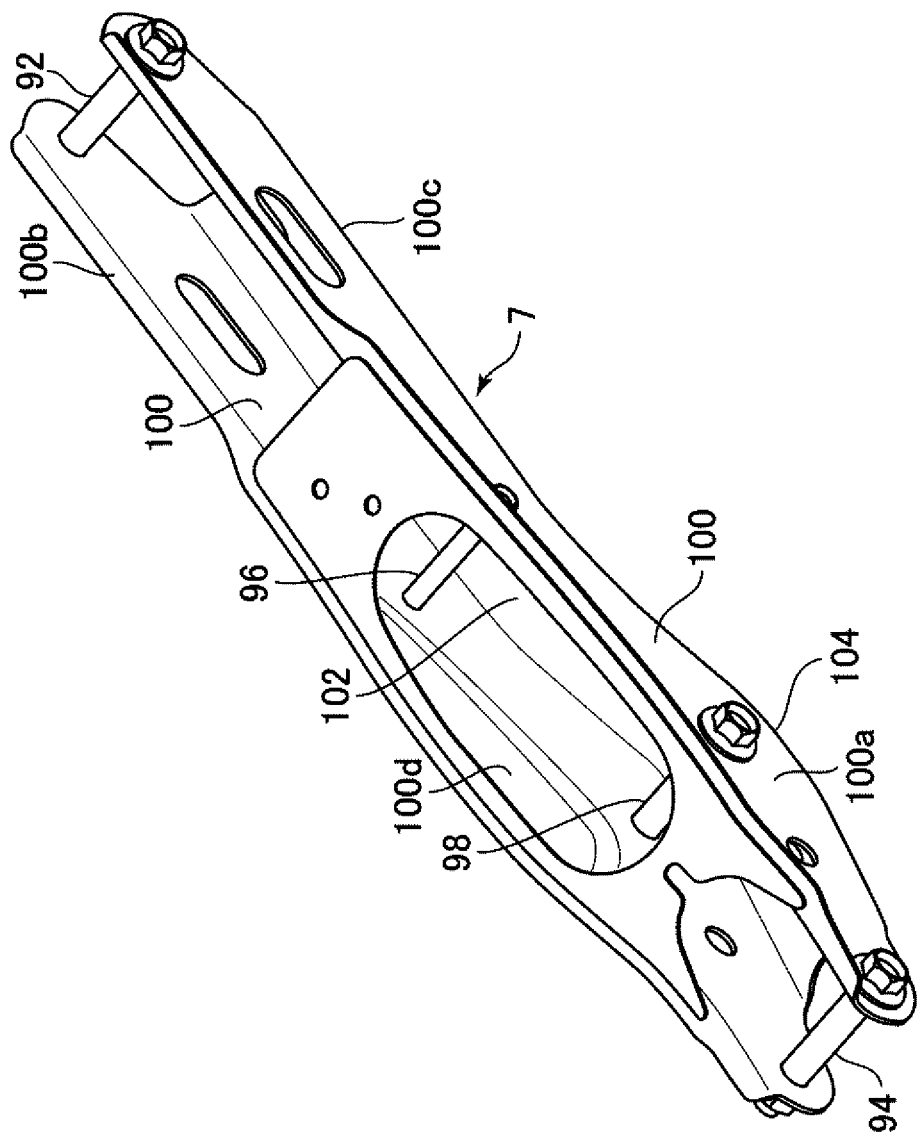
FIG. 8 is a perspective view showing only a lower arm of the rear suspension of FIG. 4.

Next, the configuration of the lower arm 7 will be described using FIG. 8 to FIG. 10. FIG. 8 is a perspective view showing only the lower arm of the rear suspension of FIG. 4, FIG. 9 is a plan view showing only the lower arm of the rear suspension of FIG. 4, and FIG. 10 is a rear view showing only the lower arm of the rear suspension of FIG. 4.

Figure 9:
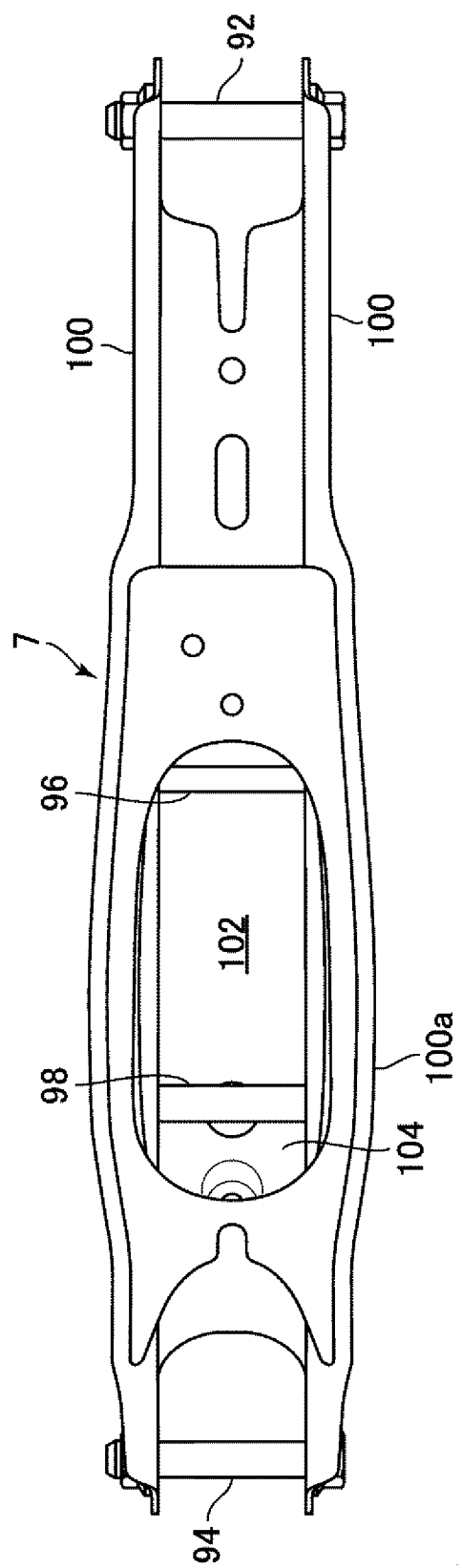
FIG. 9 is a plan view showing only the lower arm of the rear suspension of FIG. 4.
Figure 10:
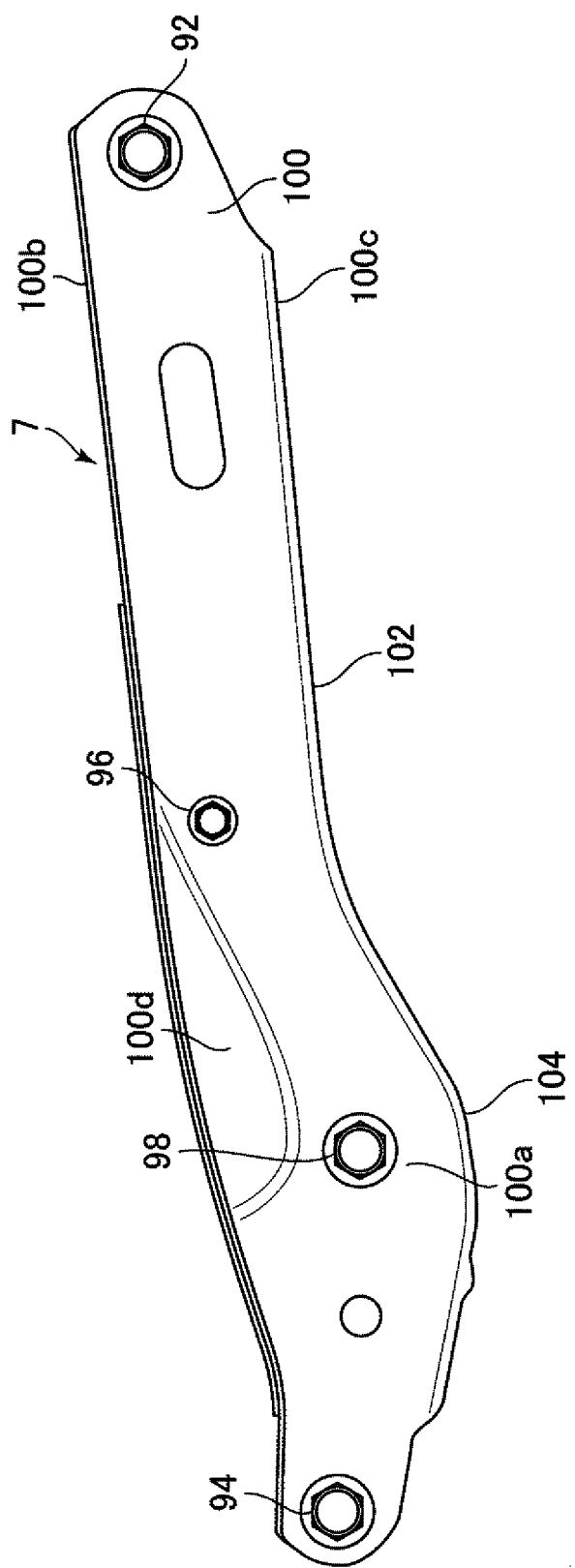
FIG. 10 is a rear view showing only the lower arm of the rear suspension of FIG. 4.

First, as shown in FIG. 8 to FIG. 10, a vehicle-body-side mounting portion 92 is provided at one end of the lower arm 7 in the longitudinal direction, and the bushing 66 (see FIG. 11) is mounted to this vehicle-body-side mounting portion 92. The vehicle-body-side mounting portion 92 is mounted to the mounting seat 34 of the above-mentioned side cross member 24 (26) through this bushing 66.

Moreover, a wheel-side mounting portion 94 is provided at the other end of the lower arm in the longitudinal direction, and the bushing 72 (see FIG. 11) is mounted to this wheel-side mounting portion 94. The wheel-side mounting portion 94 is mounted to the wheel support 10 at the connecting portion 70 through this bushing 72.

Moreover, provided at the center portion of the lower arm 7 in the longitudinal direction is a stabilizer-link mounting portion 96 where stabilizer links 18a (see FIG. 3 and FIG. 11) provided at both ends of a stabilizer bar (stabilizer link) 18 are mounted.

Further, a damper mounting portion 98 is placed between the wheel-side mounting portion 94 and the stabilizer-link mounting portion 96 in the longitudinal direction of the lower arm 7, and the lower end of the damper 14 of the shock absorber 16 is mounted to this damper mounting portion 98.

The lower arm 7 has wall surfaces 100 formed to face each other in the front-rear direction orthogonal to the longitudinal direction of the lower arm 7, and a bottom surface 102 extending so as to connect these wall surfaces 100, and the lower arm 7 has an upwardly open U-shaped cross-section formed by these wall surfaces 100 and bottom surface 102.

On the front and rear wall surfaces 100 facing each other, as shown in the drawings, the above-mentioned bolt-shaped mounting portions 92, 94, 96, 98 are mounted.

Further, the bottom surface 102 of the lower arm 7 is formed with a bulge 104 bulging downward at a position under the damper mounting portion 98. Furthermore, as shown particularly in FIG. 10, a portion 100a of each of the front and rear wall surfaces 100 where the damper mounting portion 98 is placed is formed to have a longer length in the front-rear direction than other portions, in conformance with the shape of the bulge 104. That is, as shown in FIG. 10, when viewed in the front-rear direction, an upper edge 100b of the lower arm 7 (upper edge of the wall surface 100) extends substantially linearly from the vehicle-body-side mounting portion 92 to the wheel-side mounting portion 94, whereas a part of a lower edge 100c of the lower arm 7 (lower edge of the wall surface 100 and the bottom surface 102) bulges downward. According to such a configuration, a vertical cross-section of this bulge 104 is also formed in a U-shaped cross-section (see FIG. 12).

Furthermore, as shown in the drawing, a rib 100d is formed from the damper mounting portion 98 to the stabilizer-link mounting portion 96 of each of the front and rear wall surfaces 100. More specifically, the rib 100d is formed, along the upper edge 100b of each of the front and rear wall surfaces 100, from a position above the damper mounting portion 98 to a position above the stabilizer-link mounting portion 96. As a modification, the rib (100d) may be formed, along the upper edge 100b of each of the front and rear wall surfaces 100, from a position above the wheel-side mounting portion 94 to the position above the stabilizer-link mounting portion 96 via the position above the damper mounting portion 98.

Figure 11:
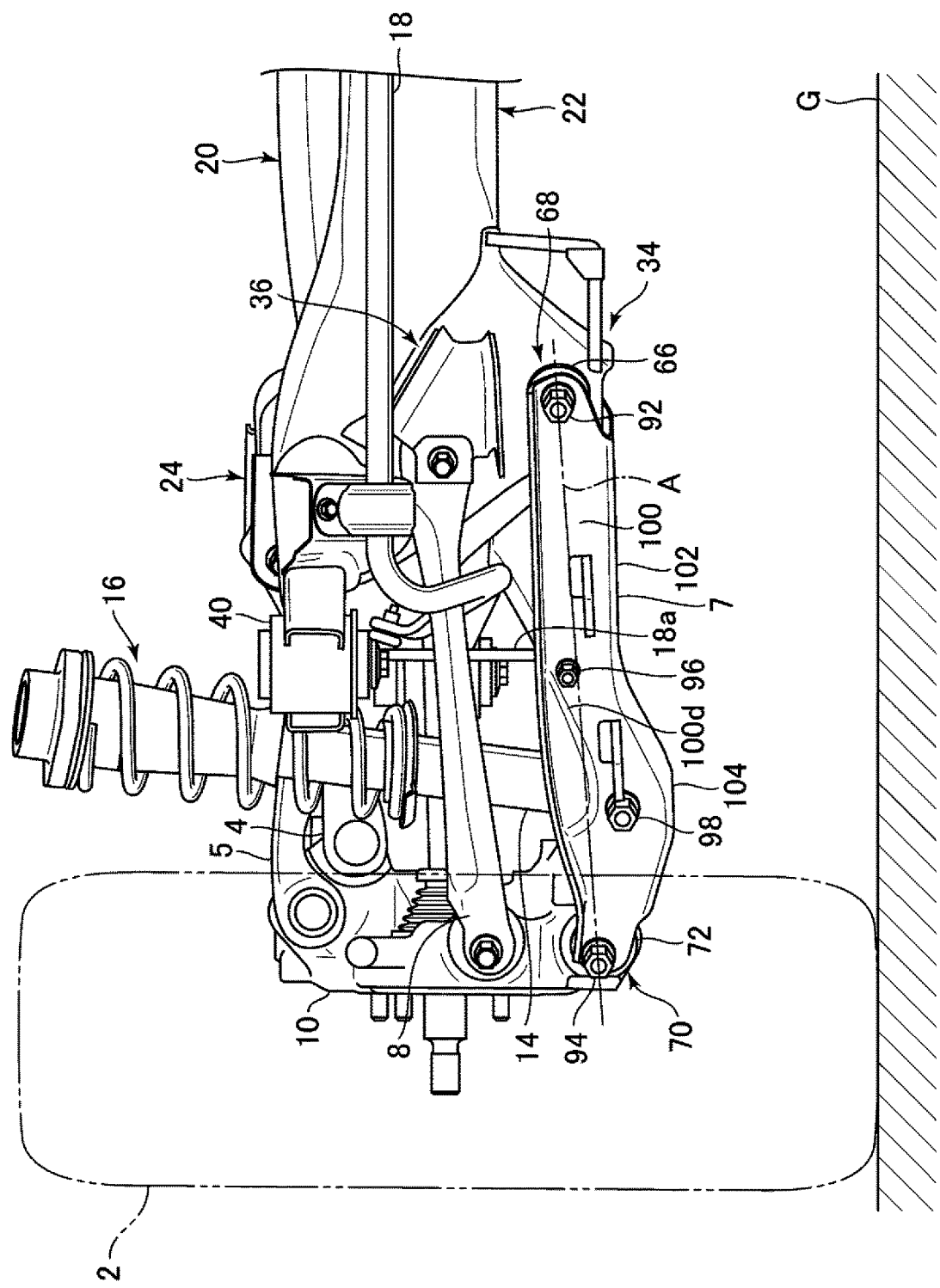
FIG. 11 is a rear view showing, in an enlarged manner, the vehicle's left-side rear suspension of the rear suspension assembly shown in FIG. 3.

Next, the mounting configuration of the damper 14 to the lower arm 7 will be described using FIG. 11 to FIG. 13B. FIG. 11 is a rear view showing, in an enlarged manner, the vehicle's left-side rear suspension of the rear suspension assembly shown in FIG. 3, FIG. 12 is a partial cross-sectional side view of the lower arm as viewed from a longitudinal-direction outer side to explain the damper mounting portion and the bulge of the lower arm of the rear suspension of FIG. 4, and FIGS. 13A-13B are schematic views of the lower arm and the damper as viewed from the vehicle rear side to explain the function of the mounting configuration of the damper to the lower arm according to the present embodiment, wherein FIG. 13A shows a comparative example, and FIG. 13B shows the configuration of the present embodiment.

First, as shown in FIG. 11, the damper mounting portion 98 is placed at a position lower than a straight line (indicated as a virtual line A) connecting the vehicle-body-side pivot (connecting portion) 68 and a wheel-side pivot (connecting portion) 70 of the lower arm 7, more specifically, the straight line (virtual line A) connecting the above-mentioned vehicle-body-side mounting portion 92 and the above-mentioned wheel-side mounting portion 94 of the lower arm 7.

Moreover, the distance between the bulge 104 and a road surface G is a distance that ensures a predetermined road clearance as shown in the drawing.

Figure 12:
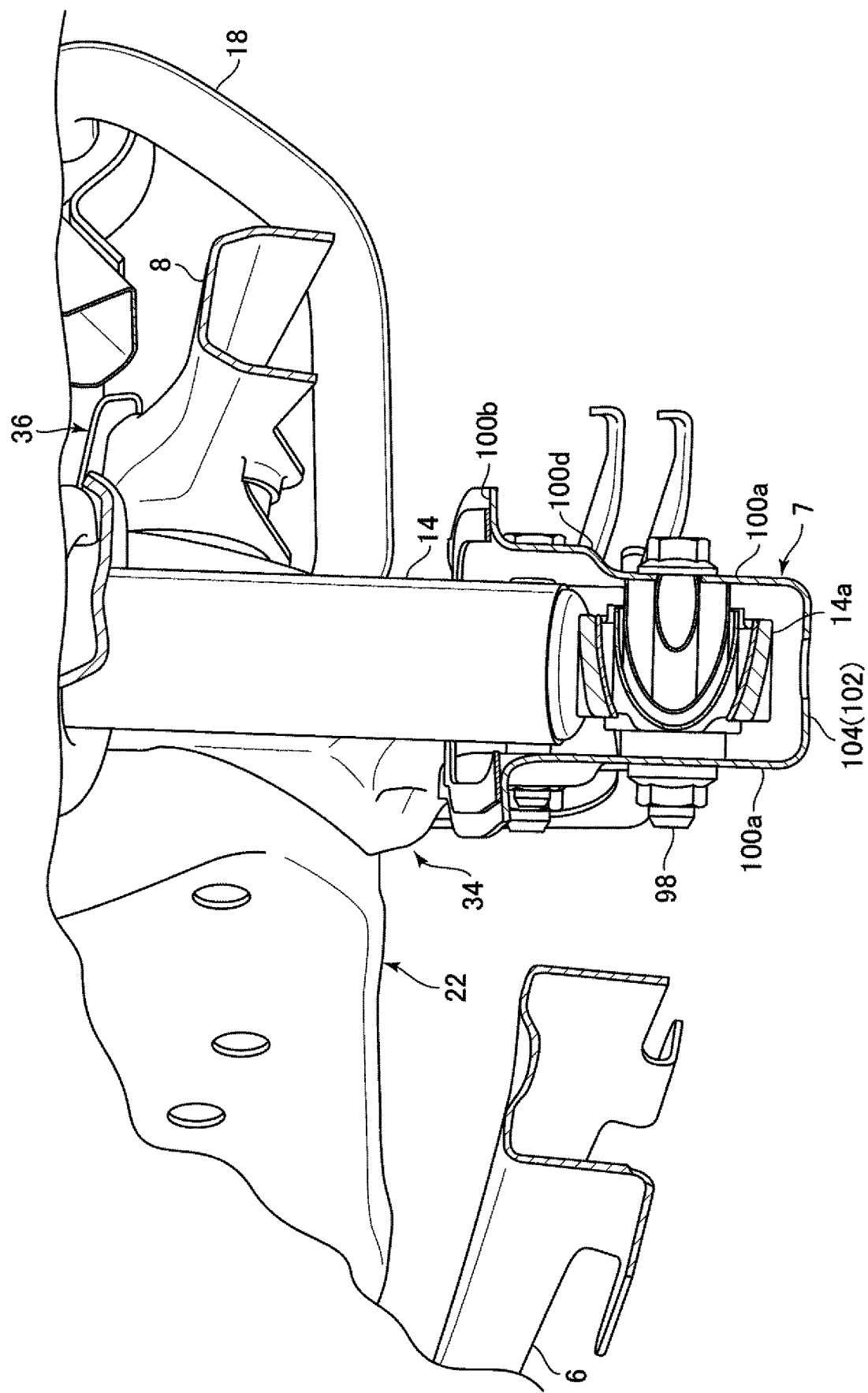
FIG. 12 is a partial cross-sectional side view as viewed from a longitudinal-direction outer side of the lower arm to explain a damper mounting portion and a bulge of the lower arm of the rear suspension of FIG. 4.
Figure 13A:
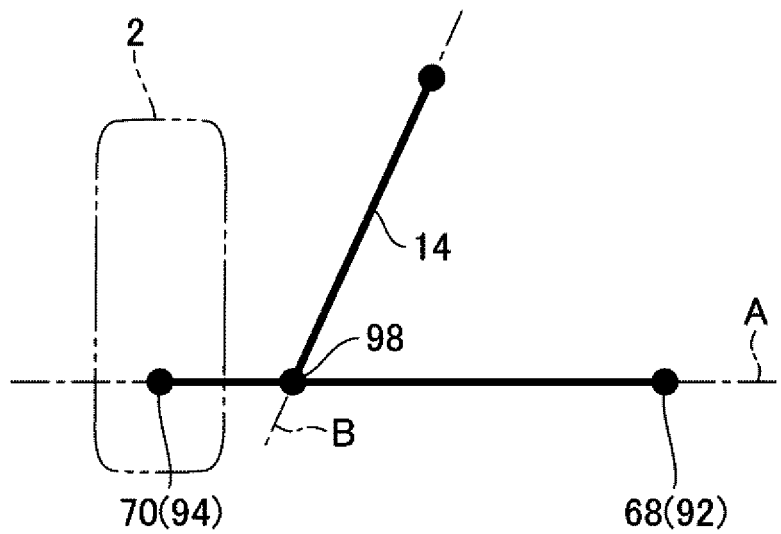
FIGS. 13A-13B are schematic views of the lower arm and the damper as viewed from the vehicle rear side to explain the function of a mounting configuration of the damper to the lower arm according to the present embodiment.
Figure 13B:
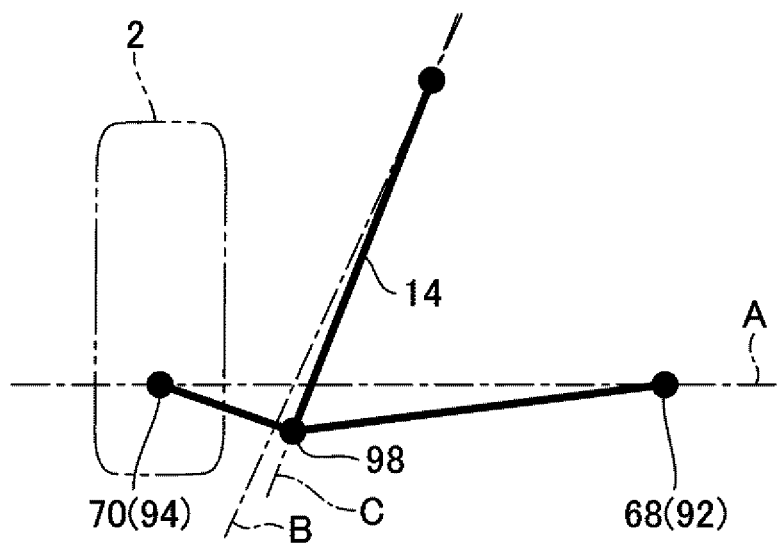

Next, as shown in FIG. 12, at the position of the damper mounting portion 98 of the lower arm 7 shown in the vertical cross-section, the bulge 104 is formed to accommodate a pivot 14a of the damper 14. More specifically, as shown in FIG. 12, the pivot 14a of the damper 14 is accommodated in the above-mentioned U-shaped cross-section at the positions of the damper mounting portion 98 and the bulge 104.

Next, in the present embodiment, as described above, the damper mounting portion 98 is placed at the position lower than the straight line (virtual line A in FIG. 11) connecting the wheel-side pivot 70 and the vehicle-body-side pivot 68 of the lower arm 7. Consequently, in comparison with an inclination angle of the axial line of the damper 14 (indicated as a virtual line B) when the damper mounting portion 98 is placed on the straight line connecting the pivots 68 and 70 as shown in FIG. 13A as a comparative example, when the damper mounting portion 98 is placed at the position lower than the straight line (virtual line A) connecting the pivots 68 and 70 as shown in FIG. 13B of the present embodiment, it is possible to set an inclination angle of the axis line of the damper 14 (indicated as a virtual line C) in the rear view to a smaller inclination angle, that is, an inclination angle that allows the damper 14 to stand more vertically.

The present disclosure is not limited to the configuration of the above-mentioned embodiment, and includes other various configurations. For example, in the present embodiment, each of the left and right rear suspensions 1 is mounted to the vehicle body by the subframe 3, but the present disclosure is not limited to this, and the rear suspension 1 may be directly mounted to the vehicle body. Moreover, for example, in order to improve steering stability, the leading arm 6 and the lower arm 7 may be connected to the wheel support 10 through ball joints. Furthermore, the bushings are not limited to rubber bushings, and may be made of a resin having required elasticity.

Next, the function and effect of the present embodiment will be described.

The automobile suspension device 1 according to the present embodiment includes the wheel support 10 that supports the wheel 2, and has the opening 84 formed at the center portion to allow the axle to pass therethrough; the trailing arm 6 and the lower arm 7 connecting a lower portion (lower raised wall 88) of the wheel support 10 and the vehicle body; the upper arm 4 and the leading arm 5 connecting an upper portion (front raised wall 86) of the wheel support 10 and the vehicle body; the control arm 8 connecting a rear portion (rear raised wall 90) of the wheel support 10 and the vehicle body; and the damper 14 that has an upper end connected to the vehicle body and a lower end connected to the lower arm 7, and is disposed to incline upward toward the vehicle-width-direction inner side in the rear view, wherein the lower arm 7 has a vehicle-body-side end connected to the vehicle body through the pivot 68 and a wheel-side end connected to the wheel support 10 through the pivot 70, the damper 14 is connected to the lower arm 7 through the pivot 14a, the lower arm 7 has the upwardly open U-shaped cross-section formed by the front and rear wall surfaces 100 and the bottom surface 102 extending in the longitudinal direction of the lower arm 7, each of the front and rear wall surfaces 100 of the lower arm 7 has the damper mounting portion 98, which supports the pivot 14a of the damper 14, at a position lower than the straight line (virtual line A) connecting the pivot 70 on the wheel side and the pivot 68 on the vehicle-body side of the lower arm 7, and the bottom surface 102 of the lower arm 7 is formed with the bulge 104 bulging downward, at a position under the damper mounting portion 8, to accommodate the pivot 14a of the damper 14.

According to the present embodiment thus configured, since the damper mounting portion 98 is set at the position lower than the straight line (virtual line A) connecting the pivot 70 on the wheel side and the pivot 68 on the vehicle-body side of the lower arm 7, the inclination angle of the damper 14 (inclination angle of the axial line C) can be made smaller by a corresponding amount in the rear view. That is, the inclination angle can be set to allow the damper 14 to stand vertically. Hence, in the 5-link suspension device 1 configured to support the lower end of the damper 14 with the lower arm 7, it is possible to reduce sliding friction while ensuring a road clearance.

Moreover, according to the present embodiment, since the damper mounting portion 98 is set at a position lower than the straight line (virtual line A) connecting the pivot 70 on the wheel side and the pivot 68 on the vehicle-body side of the lower arm 7, and the bulge 104 is formed, the area of the wall surface 100 is increased, and the lower arm 7 (particularly, the wall surface 100 in the vicinity of the bulge 104) is easy to deform due to the increase of the area, but deformation of each of the front and rear wall surfaces 100 can be prevented by the rib 100d, thereby preventing deformation of the lower arm 7 and reducing geometric changes in the damper mounting portion 98 and the stabilizer-link mounting portion 96.

What is claimed is:

1. An automobile suspension device comprising:
   a wheel support that supports a wheel and has an opening formed at a center portion to allow an axle to pass therethrough;
   a trailing arm and a lower arm connecting a lower portion of the wheel support and a vehicle body;
   an upper arm and a leading arm connecting an upper portion of the wheel support and the vehicle body;
   a control arm connecting a rear portion of the wheel support and the vehicle body; and
   a damper that has an upper end connected to the vehicle body and a lower end connected to the lower arm, and is disposed to incline upward toward a vehicle-width-direction inner side in a rear view, wherein the lower arm has a vehicle-body-side end connected to the vehicle body through a pivot, and a wheel-side end connected to the wheel support through a pivot, the damper is connected to the lower arm through a pivot, the lower arm has an upwardly open U-shaped cross-section formed by front and rear wall surfaces and a bottom surface extending in a longitudinal direction of the lower arm, each of the front and rear wall surfaces of the lower arm has a damper mounting portion, which axially supports the pivot of the damper, at a position lower than a straight line connecting the pivot on the wheel side of the lower arm and the pivot on the vehicle-body side of the lower arm, and the bottom surface of the lower arm has a bulge bulging downward, at a position under the damper mounting portion, to accommodate the pivot of the damper.

2. The automobile suspension device according to claim 1, wherein each of the front and rear wall surfaces of the lower arm has a stabilizer-link mounting portion, at a position on a vehicle-width-direction inner side relative to the damper mounting portion, and each of the front and rear wall surfaces of the lower arm has a rib extending in the longitudinal direction at least from the damper mounting portion to the stabilizer-link mounting portion.

* * * * *